US010506804B2

(12) United States Patent
Gaugler et al.

(10) Patent No.: US 10,506,804 B2
(45) Date of Patent: Dec. 17, 2019

(54) COLLAPSIBLE STACKABLE DISPOSABLE INEXPENSIVE PESTICIDE FREE TRAPS AND ATTRACTANT FOR SURVEILLANCE AND CONTROL OF AEDES CONTAINER BREEDING MOSQUITOS AND OTHER CONTAINER BREEDING INSECTS

(71) Applicant: Rutgers, The State University of New Jersey, New Brunswick, NJ (US)

(72) Inventors: Randy Gaugler, North Brunswick, NJ (US); Yi Wang, South River, NJ (US); Kshitij Chandel, New Brunswick, NJ (US); Devi S. Suman, Highland Park, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 488 days.

(21) Appl. No.: 15/202,564

(22) Filed: Jul. 5, 2016

(65) Prior Publication Data
US 2017/0000101 A1 Jan. 5, 2017

Related U.S. Application Data

(60) Provisional application No. 62/188,271, filed on Jul. 2, 2015.

(51) Int. Cl.
*A01M 1/16* (2006.01)
*A01M 1/02* (2006.01)

(52) U.S. Cl.
CPC .............. *A01M 1/165* (2013.01); *A01M 1/02* (2013.01)

(58) Field of Classification Search
CPC ......... A01M 1/106; A01M 1/16; A01M 1/165
USPC ..................... 43/114–116, 121, 122
See application file for complete search history.

(56) References Cited

U.S. PATENT DOCUMENTS

| | | | | |
|---|---|---|---|---|
| 2,424,421 A * | 7/1947 | Temme | ................... | A01M 1/02 43/121 |
| 6,546,667 B1 * | 4/2003 | Carter | ..................... | A01M 1/04 43/107 |
| 2005/0210735 A1 * | 9/2005 | Harmer | .................. | A01M 1/02 43/107 |
| 2007/0044372 A1 * | 3/2007 | Lang | ..................... | A01M 1/023 43/114 |
| 2009/0260277 A1 * | 10/2009 | Lebost | .................... | A01M 1/02 43/114 |
| 2010/0192451 A1 * | 8/2010 | Ponnusamy | ........... | A01N 37/02 43/114 |
| 2013/0067795 A1 * | 3/2013 | Wesson | ................. | A01M 1/106 43/107 |

OTHER PUBLICATIONS

Anderson, E. M., et al. "Field Evaluation of the Response of Aedes albopictus (Stegomyia albopicta) to Three Oviposition Attractants and Different Ovitrap Placements Using Black and Clear Autocidal Ovitraps in a Rural Area of Same, Timor-Leste" Medical and Veterinary Entomology (2014) vol. 28, pp. 372-383.

(Continued)

*Primary Examiner* — Peter M Poon
*Assistant Examiner* — Danielle A Clerkley
(74) *Attorney, Agent, or Firm* — Kathleen D. Rigaut; Howson & Howson LLP

(57) ABSTRACT

An inexpensive, biodegradable, easily transportable mosquito trap and improved attractant formulation and apparatus are provided.

9 Claims, 10 Drawing Sheets

(56) References Cited

OTHER PUBLICATIONS

Abramides, G. Effectiveness of an Integrated Vector Management Control Strategy for the Tiger Mosquito (*Aedes albopictus*): a case study in Sant Cugat del Valles (Barcelona) ICTA Universitat Autonoma de Barcelona, Sep. 2012.

Juan, L., et al. A New Ovitrap Made of Slow Release Natural Materials Containing Pyriproxyfen for Aedes aegypti (Diptera:Culicidae) Control, Journal of Medical Entomology (2013) vol. 50:4, pp. 916-919.

Ritchie, S., et al. Field Validation of the Gravid Aedes Trap (GAT) for Collection of Aedes aegypti (Diptera:Culicidae), Journal of Medical Entomology (2014) vol. 51,:1 pp. 210-219.

Snetselaar, J., et al. Development and Evaluation of a Novel Contamination Device that Targets Multiple Life-Stages of Aedes aegypti, Parasites and Vectors (2014) vol. 7:200, pp. 1-10.

Ritchie, S., et al. A Biodegradable Lethal Ovitrap for Control of Container-Breeding Aedes, Journal of the American Mosquito Control Association (2008) vol. 24:1 pp. 47-53.

Rapley, L.P., et al. A Lethal Ovitrap-Based Mass Trapping Scheme for Dengue Control in Australia: II. Impact on Populations of the Mosquito *Aedes aegypti*, Medical and Veterinary Entomology (2009) vol. 23, pp. 303-316.

* cited by examiner

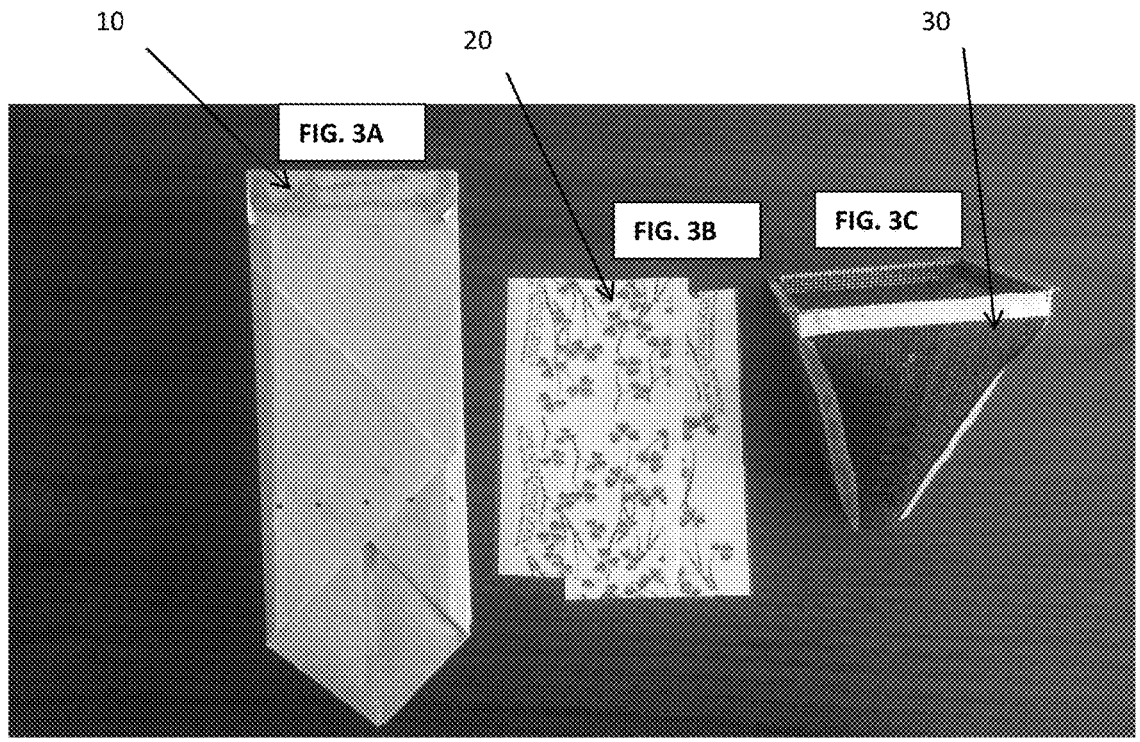
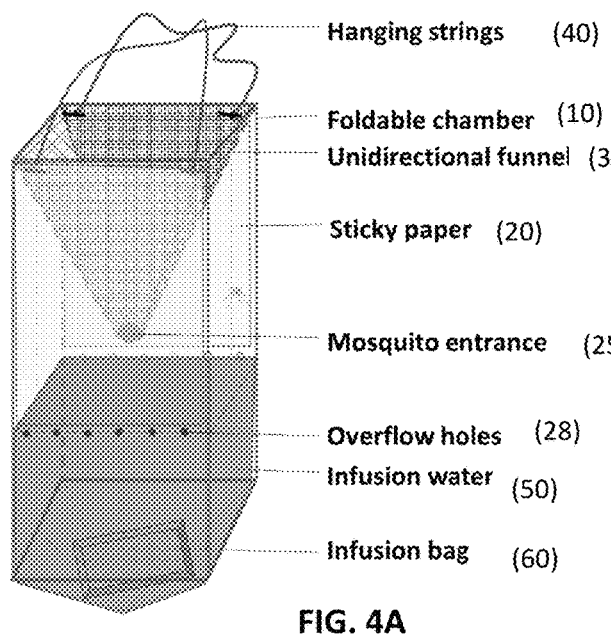
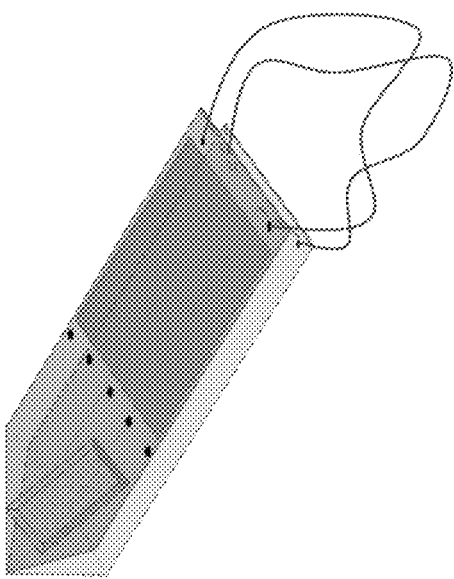
FIG. 4A          FIG. 4B
- Hanging strings (40)
- Foldable chamber (10)
- Unidirectional funnel (30)
- Sticky paper (20)
- Mosquito entrance (25)
- Overflow holes (28)
- Infusion water (50)
- Infusion bag (60)

COLLAPSIBLE STACKABLE DISPOSABLE INEXPENSIVE PESTICIDE FREE TRAPS AND ATTRACTANT FOR SURVEILLANCE AND CONTROL OF AEDES CONTAINER BREEDING MOSQUITOS AND OTHER CONTAINER BREEDING INSECTS

This application claims priority to U.S. Provisional Application No. 62/188,271 filed Jul. 2, 2015, the entire contents being incorporated herein as though set forth in full.

This invention was made with government support under Grant Number 4-32131 awarded by the Department of Defense, Grant Numbers USDA-ARS-58-6615-8-105 and USDA-ARS-58-0208-0-066 awarded by the U.S. Department of Agriculture, and Agricultural Research Service, respectively, and NIH-SBIR Grant Number IR43AI096563-01A1. The U.S. government has certain rights in the invention.

FIELD OF THE INVENTION

The present invention relates to insect control. More specifically, the invention provides an improved biodegradable pesticide free mosquito trap, novel attractant and improved dispensing system for the attractant.

BACKGROUND OF THE INVENTION

Several publications and patent documents are cited throughout the specification in order to describe the state of the art to which this invention pertains. Each of these citations is incorporated by reference herein as though set forth in full.

Several viral infections, including dengue fever, yellow fever, West Nile fever, chikungunya, Zika, and eastern equine encephalitis are transmitted by members of the *Aedes* genus such as *Aedes aegypti* and *Aedes albopictus*. These infections are typically accompanied by a fever, and, in some cases, encephalitis, which can lead to death. The best method to contain these diseases is surveillance and vector control. Most common techniques used for vector control involve insecticides (mainly adulticide), mosquito traps, insect repellents, and mosquito nets. However, it's very common that these interventions are overcome by vectors very quickly. Clearly, there is an urgent need for pesticide-free lethal ovitrap, which can be deployed as an inexpensive surveillance and vector control device.

SUMMARY OF THE INVENTION

In accordance with the present invention, a foldable, stackable, biodegradable, chemical-free, inexpensive trap device is provided. In a preferred embodiment of the trap, mosquitoes enter through a unidirectional funnel following the attractant. After the mosquitoes enter the chamber, they cannot exit. Once they touch the chamber that is wall mounted with sticky paper, they are trapped. The specimen can then be removed with a pair of forceps for ID or molecular analysis.

In a preferred embodiment, a mosquito trap comprising: a biodegradable, foldable container having an open end for insertion of a unidirectional funnel, said funnel including an opening to access an interior of the container, said interior of the container including paper comprising an adhesive effective for trapping mosquitoes, said container being capable of holding an infusion of at least one attractant for attracting said mosquitoes. The trap can further comprising overflow holes to prevent overflow of said container. In a particularly preferred embodiment the trap is pesticide free. In yet another embodiment, the attractant comprises 10 g oak wood, 5 g oak leaf, 1 L water, infused about one week, optionally contained within an infusion bag suspended above a water surface. The trap also comprises hanging strings for hanging said trap at a site of interest.

In one embodiment, the attractant is provided in an infusion bag, said bag comprising one or more wicks for moisturizing said attractant. In a preferred embodiment, hanging strings for hanging said trap and means for suspending an attractant containing infusion bag above water present in said trap, said infusion bag comprising a wick for moisturizing said attractant with water present in the trap. In a particularly preferred embodiment, the infusion bag extends oviposition attractancy of said attractant as compared to attractancy when infusion bag is submerged in water in said container. The presently claimed attractant is more attractive to gravid *Ae. albopictus* and *Ae. aegypti* females than traditional oak infusions. The attractant also attracts non-blood fed *Ae. albopictus* females and *Ae. albopictus* males.

In a preferred embodiment, an infusion bag comprising an oviposition attractant consisting of 10 g oak wood, 5 g oak leaf, 1 L water, infused about one week, said bag comprising one or more wicks for moisturizing said attractant is provided. In another embodiment, an infusion platform comprising an oviposition attractant encased in a porous mesh, said attractant consisting of 10 g oak wood, 5 g oak leaf, 1 L water, infused about one week, wherein said platform floats or is suspended over water in an insect trap and comprises one or more wicks for moisturizing said attractant.

BRIEF DESCRIPTION OF THE DRAWINGS

FIGS. 3A-3C. The 3 major components of the collapsible trap of the invention. FIG. 3A. foldable chamber (10). FIG. 3B. Sticky paper (20). FIG. 3C. Unidirectional funnel (30).

FIGS. 4A-4B. Trap device in working status (FIG. 4A) and folded chamber (FIG. 4B), unidirectional cone (30) inserted on top of the chamber or container (10) to hold the bag into a cup shape as shown in (FIG. 4A). Hanging strings (40); sticky paper (20); mosquito entrance (25); overflow holes (28); infusion water (50); submerged infusion bag (60).

DETAILED DESCRIPTION OF THE INVENTION

Figure 1:
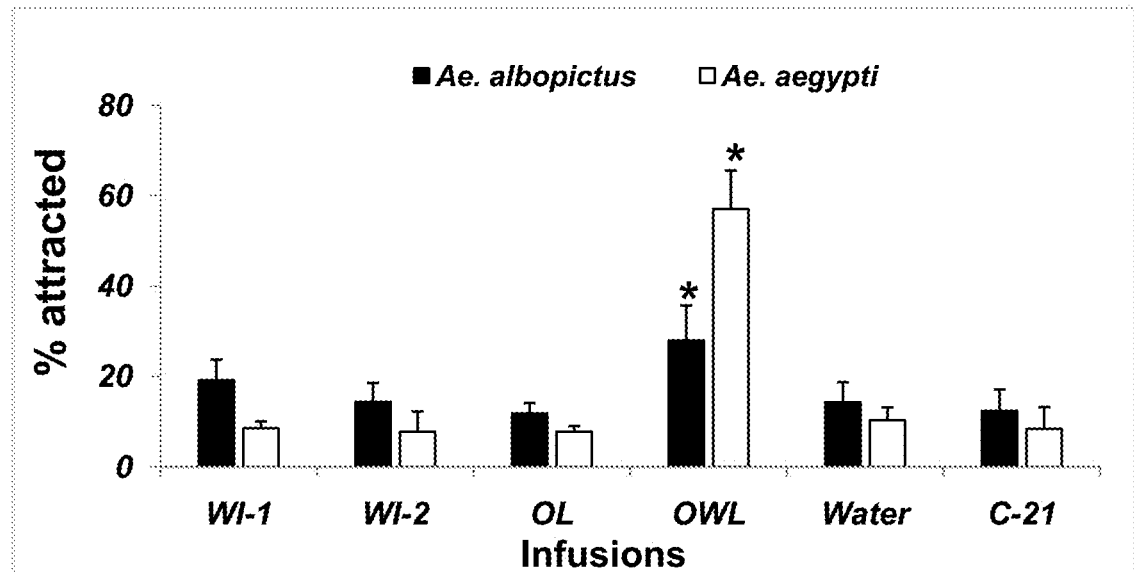
FIG. 1. The infusion formulation (OWL) shows significantly higher attraction when compared to other recipes tested. [WI-2 wood infusion (5 g/l); WI-2 wood infusion (10 g/l); OL—oak leaf infusion (8.4 g/l); OWL—oak wood (10 g/L)+leaf (5 g/L) infusion; C21-n-heneicosane)

Container mosquitoes such as *Aedes albopictus* and *Aedes aegypti* are vectors that transmit more than 30 arboviruses including dengue, Zika and chikungunya viruses. Existing technologies for surveillance and vector control are very costly. For example, the heavily used BGS trap costs around $200, which is not affordable for widespread use in developing countries. Vector control for these mosquitoes is primarily based on adulticide intervention. However, due to the short residue of the chemicals and mosquito cryptic habitats, which are immune to broadcast pesticide application, populations rebound soon after the intervention. Virtually all mosquito control agencies use gravid traps and as an important tool for collecting female mosquitoes for surveillance, species identification, and parasite detection.

Gravid females are highly specific in oviposition site selection when laying their eggs. Females are able to detect quality and suitability of oviposition sites using various types of cues. Olfactory cues are helpful from long distances for locating suitable oviposition sites. The success of gravid traps mainly depends on the effectiveness of oviposition lure used. Attracting gravid females to a particular container is a big challenge and various plants, synthetic chemicals, bacterial species have been tested for their oviposition attractancy and oviposition stimulant activity (Afify and Galizia 2015). Infusions prepared from white oak, water oak, St. Augustine grass and bamboo leaves were found to attract gravid *Ae. albopictus* and *Ae. aegypti* females (Afify and Galizia 2015). An infusion prepared from white oak leaf (*Quercus alba*) has shown strong oviposition attractancy against *Ae. aegypti, Ae. albopictus* and *Aedes trisariatus* under laboratory conditions (Trexler et al., 1998, Ponnusamy et al., 2010). However, there is no highly efficacious commercial gravid trap available for long term efficacy.

The trap of the present invention is superior over prior art traps for at least the following reasons:

(1) Chemical free: Our device uses sticky paper to kill mosquitoes and thus does not include chemical pesticides. This makes the device safe to other animals and safe to dispose after use without causing any harm to the environment.

(2) Biodegradable: Every part of the trap can be made with biodegradable material such as wax paper, cotton mesh and sticky paper, further enhancing its safety to the environment.

(3) Inexpensive and simple for end users: It is vital for the trap to be inexpensive so sufficient units can be deployed to compete with natural oviposition sites. The trap is very economical to manufacture and deploy as it basically comprises a paper bag, a mesh funnel and two strips of sticky paper.

(4) Easy manufacture: The trap consists only 3 simple parts, including a foldable paper bag, a unidirectional funnel and 2 strips of sticky paper making it both simple and easy for manufacture and facilitating end user setup.

(5) Foldable/collapsible for easy transportation: The trap is foldable/collapsible before usage for easy storage, packing and transportation. It is also convenient to dispose after usage. All you need to do is to discard the water, fold, and dispose.

(6) Effective for trapping gravid, unfed females and males of container mosquitoes: Every effort has been made to have the trap be as attractive as possible for all physiological stages of the adult mosquitoes since the attraction is the key for this device. The attractant developed has higher attractancy than the commonly used oak infusion to the two species tested *Aedes albopictus* and *Aedes aegypti*.

(7) Extended attractancy of improved infusion formulation: A unique method and apparatus for extending the attraction period of the infusion formulation is also provided. Instead of submerging plant material in water, we have placed plant material just above the water surface, providing water by a cotton wick, thereby keeping plant material moisturized but not completely saturated. By restricting water availability, we were able to extend the life of oviposition attractant by slowing down the microbial growth. This new approach reduces the need for maintenance or reloading of active materials over the breeding season.

(8) Specimen integrity for further molecular analysis: The mosquito specimen is intact on the sticky paper. A pair of forceps will be needed to take the mosquito body off the sticky paper for further molecular analysis.

(9) Strong and long lasting mosquito attractant infusion pouch or floating system for incorporation into existing devices including, without limitation, lethal ovitraps autodissemination stations, adult traps, and gravid traps etc. to enhance and extend attractancy. Autodissemination is the process where gravid females are utilized as a vehicle to transfer larvicide in natural larval habitats. To be able to attract gravid females is one of the critical parameter responsible for the efficient functioning of autodissemination stations. The present invention can easily be incorporated in an autodissemination station such as that described in U.S. Pat. No. 9,265,247 to enhance its attractancy for gravid females for a longer period.

Definitions:

"Mosquito" as used herein encompasses several species of mosquitos (e.g., Anopheles, Aedes, Ochlerotatus, and Culex), including but not limited to Aedes aegypti, Aedes albopictus, Aedes sierrensis, Anopheles stephensi, Anopheles culicifacies, Anopheles quadrimaculatus, Culex pipiens, Culex quinquefasciatus, Anopheles gambiae, Anopheles funestus, Anopheles albimanus, Ochlerotatus triseriatus and Culex tarsalis. Such mosquitos are gravid or egg-laying mosquitoes; however, other mosquito species are also contemplated. Mosquitoes may include, but are not limited to, gravid mosquitoes, male mosquitoes, and host-seeking female mosquitoes.

Although referred to herein as "attractants," the compositions or compounds may or may not function as classical attractants, i.e., compositions that attract mosquitoes to a site. In fact, without being limited as to theory, it is believed that the compositions or compounds may serve as arrestants that cause mosquitoes to stay at a site longer and/or as stimulants that cause mosquitoes to oviposition, i.e., lay eggs, or to lay more eggs than normal at a single site.

The following examples are provided to illustrate certain embodiments of the invention. They are not intended to limit the scope of the invention in any way.

Example I

Collapsible, Stackable, Disposable, Pesticide-free Insect Trap

We have developed a pesticide-free lethal ovitrap, which can be used to advantage as affordable surveillance and vector control devices. We have demonstrated that our trap is able to catch more than 92% of gravid females (total 50) released in a room (30 m$^3$) assay. This success was attributed to the development of attractant (10 g oak wood, 5 g oak leaf, 1 L water, one week infusion) which has shown significantly stronger attraction than regular oak infusion to the two most important vector species Ae. albopictus and Ae. aegypti (FIG. 1). Container mosquitoes were mostly evolved from tree holes before human created containers. Tree hole water become attractive to the mosquito pregnant females since there are falling leaves creating infusion that grow bacteria for mosquito food. In the past, people have been using oak leaf infusion as lure to trap oviposition mosquitoes or collect eggs. Our data have shown that if we combine oak wood and leaves to make infusion, the lure is more effective than traditional oak leaf infusion. This makes sense because it is closer to their natural habitat—tree holes. Our data has shown that the oak wood and leaf infusion not only attract gravid females but also attract unfed females and males which might be seeking resting environment or mating opportunities. Lures developed by various researchers can also be used to augment and/or replace our infusion to achieve maximum attraction to targeted physiological stages such as blood feeding mosquitoes and males. Other suitable attractants can include Brewer's yeast which has been shown to release $CO_2$ which attracts blood feeding insects such as mosquitoes and bed bugs. To enhance attraction to male mosquitoes, sugar solutions can be employed.

Figure 2:
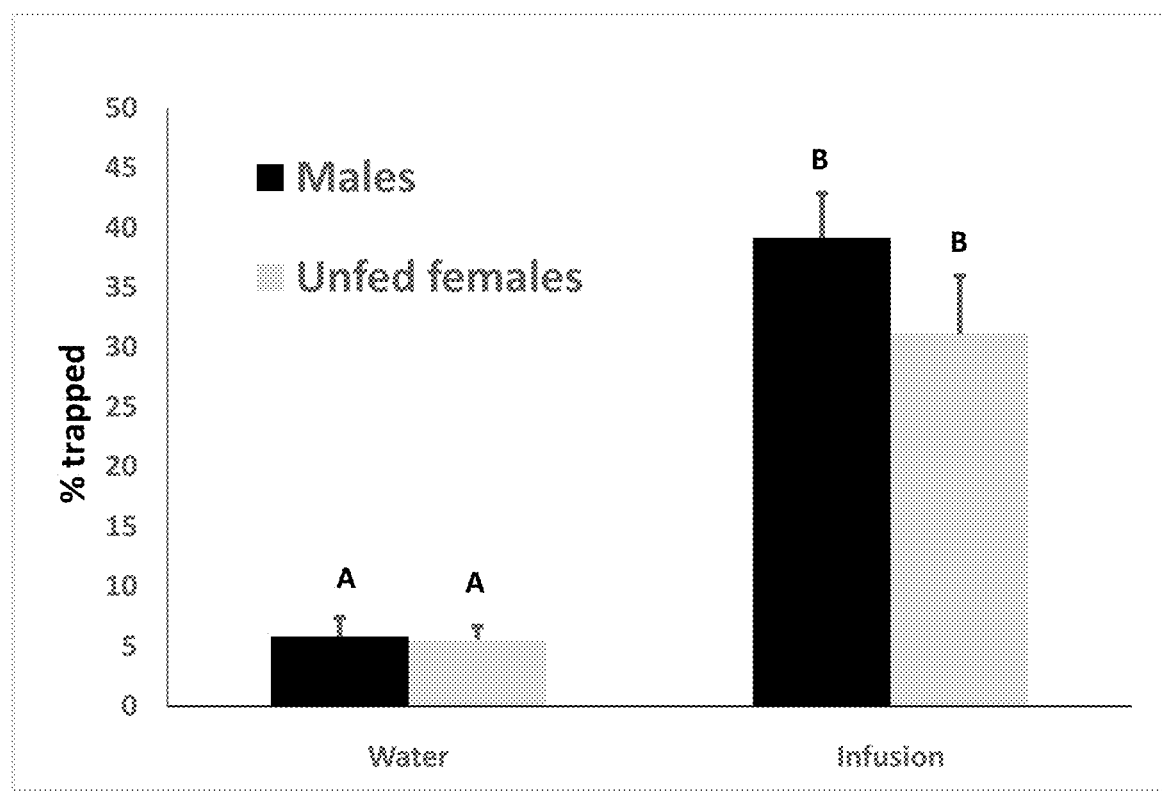
FIG. 2. Oak+wood leaf infusion attracts unfed females as well as males in a cage (1.3×1.3×1.3 M) assay.

The cage study shows that our infusion also effective to attract unfed females and males (FIG. 2). The design of the trap allows mosquitoes to enter thru a unidirectional funnel following the attractant. After the mosquitoes enter the chamber, they cannot exit. Once they touch the chamber wall mounted with sticky paper, they are trapped. The specimen can be removed with a pair of forceps for ID or molecular analysis. Our device is simple to produce and inexpensive to manufacture. The device is foldable and stackable for easy transportation in big bulky or small packages. The device is biodegradable and disposable but can be reused several times with fresh attractant and sticky papers.

Device Design

Figure 5:
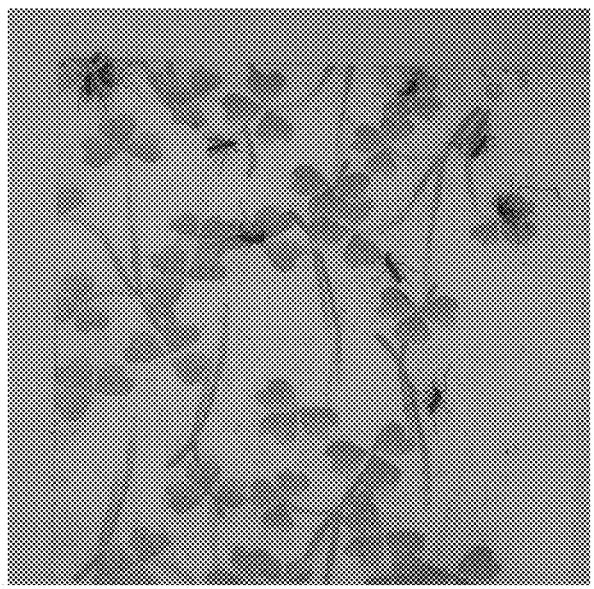
FIG. 5. Mosquitoes trapped on the sticky paper during a room assay showing the bodies are intact for further molecular analysis.
Figure 10A:
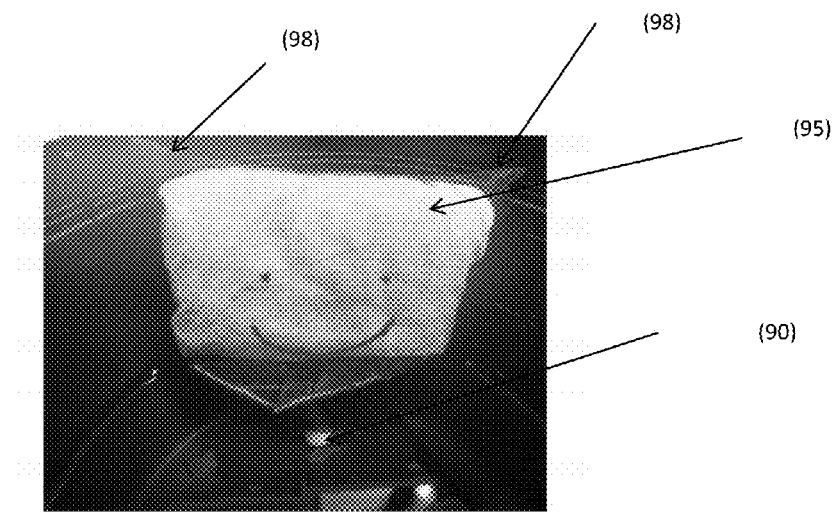
FIG. 10. Infusion pouch (95) hanging above the water surface with a cotton wick (90) inserted into the water to keep the active ingredients (70) moisturized.
Figure 10B:
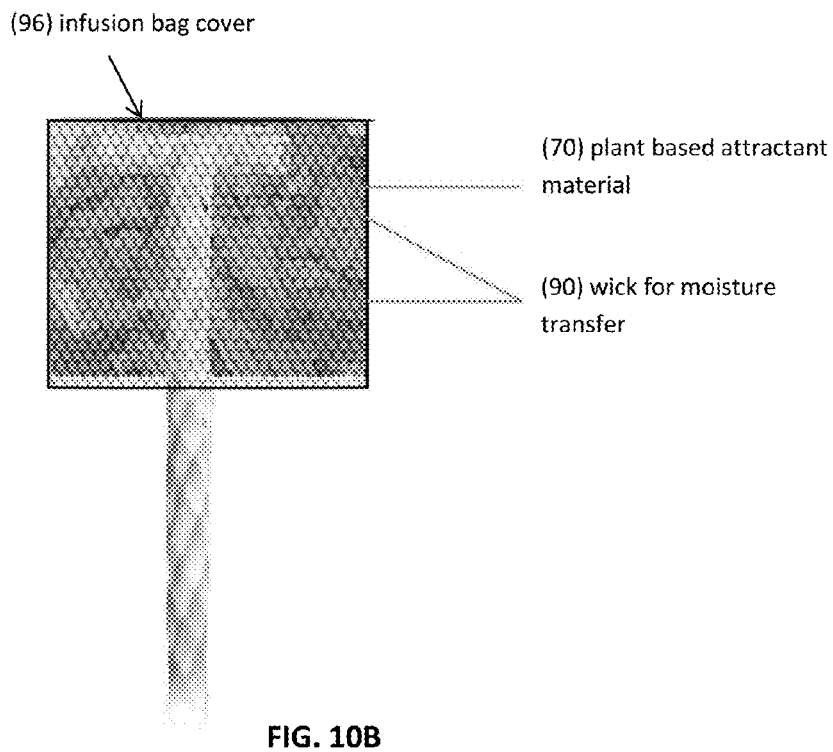

The device contains three major parts, a chamber or container (10) (foldable bag or cup) (FIG. 3A), sticky paper (20) (FIG. 3B) and a unidirectional funnel (30) (FIG. 3C). The device may optionally include a pouch (95) or platform (80). The chamber or container can be constructed with plastic sheet, wax paper, of any other paper coated with water proof agent such as Never Wet available at the market. The chamber is foldable for easy transportation and water proof for holding infusion water. Two sheets of sticky paper as shown in FIG. 3B with the liner on can be pre-mounted inside the chamber with glue strip on the back of the sticky paper. The unidirectional funnel (FIG. 3C) was made of mosquito proof screen and metal/plastic frame foldable and stackable for easy packing and shipping. A pouch containing material for infusion can also be included with the device package (FIGS. 10A and 10B). To setup, the end users first unfold the chamber or container to make it a cup, pull out the liner on top of the sticky paper, insert the funnel on top of the chamber (FIG. 4), fill water up to the drain (28) and hang it above the ground using hanging strings (40) at the proper mosquito habitat such as a shade area. After 7 days, the trap can be checked to assess whether the sticky paper or the whole trap require replacement. The traps can also be checked within 1, 2, 3, 4, 5, or 6 days to assess the condition of the sticky paper. Trapped mosquito specimens on the sticky paper can then be transported back to the laboratory for analysis if desired. (FIG. 5)

Example II

Mosquito Oviposition Attractant and Apparatus for Use

Oak infusion prepared from the leaf of white oak (Quercus alba) is very well documented for Aedes mosquitoes such as Ae. albopictus, Ae. aegypti and Aedes triseriatus (Trexler et al., 1998, Punnusamy et al., 2010). To simulate actual tree hole environment, we have prepared an infusion consisting of the oak leaf as well as oak wood. These results are described above in Example I and show that a combination of oak leaf and wood in 1:2 ratio is more attractive than the traditional oak leaf infusion containing only leaves (FIG. 1). This infusion is also efficient to attract non-blood fed females and male *Ae. albopictus* mosquitoes (FIG. 2).

Figure 6:
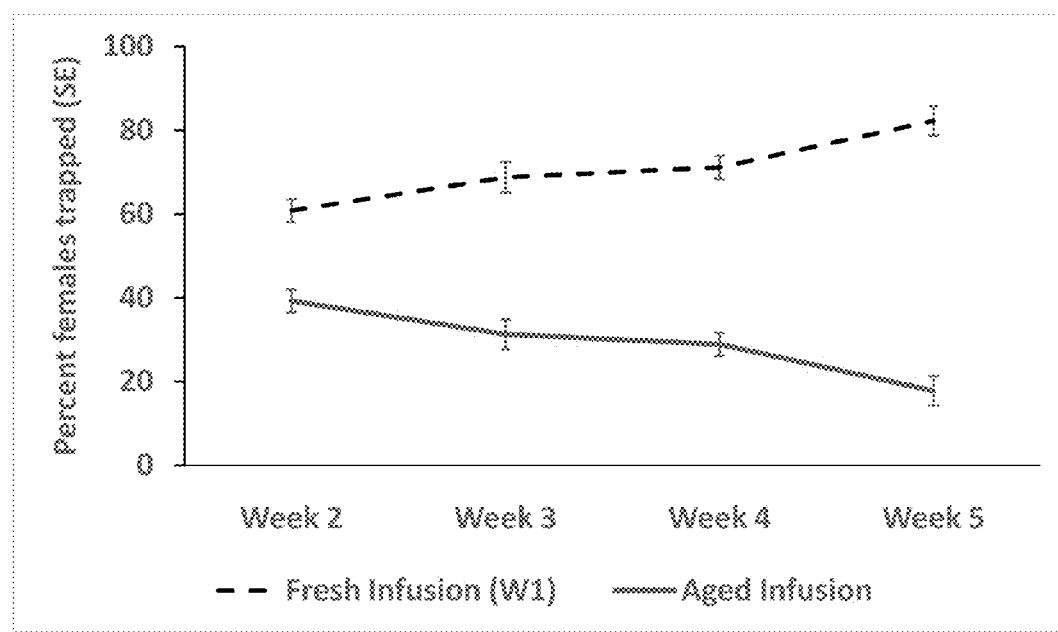
FIG. 6. Deterioration of oviposition attractancy of oak wood+leaf infusion over the time against gravid *Ae. albopictus* females when compared with one week old infusion.

We found one week old infusion is most attractive and attractancy was reduced over the time. To determine the stability of the attractant properties of the infusion over time, aged infusion (week 2 to week 5) was tested against standard freshly prepared one-week old infusion. Most studies describing the activity of plant infusions use comparisons against tap or well water (Trexler et al., 1998, Ponusammy et al., 2010). When the infusion of the invention is compared against the plain water, it shows a good activity (FIG. 1). But, during our study, we have observed that one-week-old infusion is more active then aged infusion and attractancy declined over the testing period if evaluated against freshly prepared one-week old infusion (FIG. 6). While the improved infusion formulation is more attractive than a traditional infusion, its attractancy for mosquito peaks after one-week and deteriorates quickly thereafter, having very low attractancy after 2 weeks (FIG. 6). In the infusion, plant materials act as a substrate for microbial growth, producing volatile cues by decomposition/degradation/fermentation of plant material. Submersion of plant material in water results in microbial degradation of leaf and wood giving rise to the production of chemical lures associated with strong oviposition attractancy.

To extend the active attractancy period of the oak infusion, water availability was restricted to reduce the rate of microbial degradation of plant material. This unique approach extends the attraction of infusion for longer periods. Instead of submerging plant material in water, the plant material (70) is placed just above the water surface and water is provided by a cotton wick (90), keeping the plant material moisturized but not completely soaked in water. By restricting water availability, the life of the oviposition attractant was extended by slowing down the microbial growth.

Figure 7:
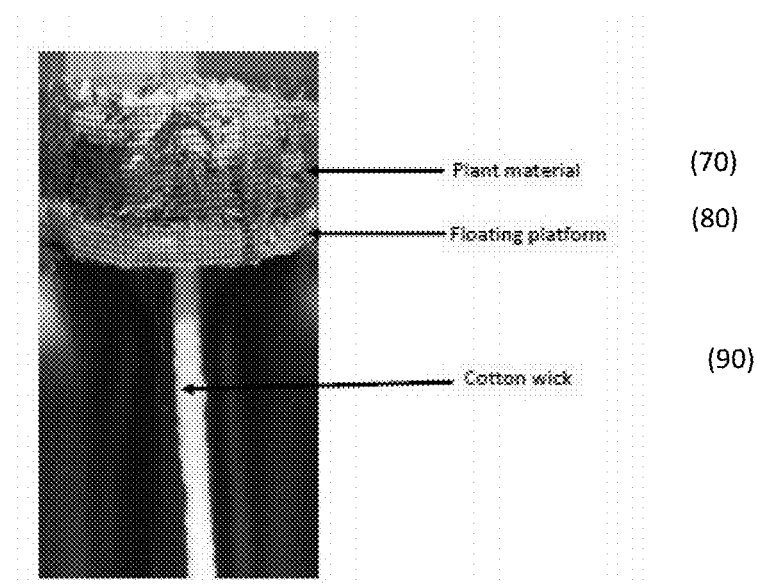
FIG. 7. Floating platform (80) containing plant material (70) (oak wood+leaf) with a cotton wick (90) running through the center of platform into the water to keep the active ingredients moisturized.
Figure 8:
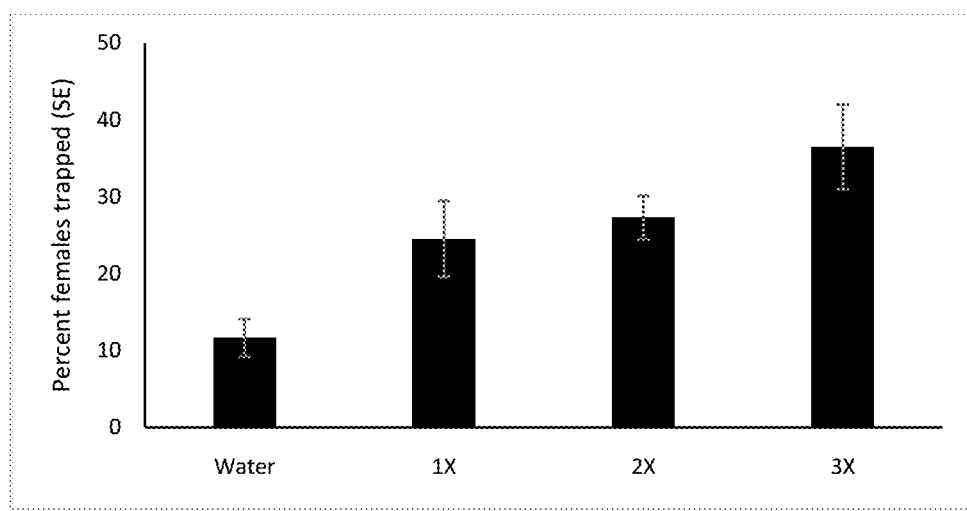
FIG. 8. Ovipositor attractancy of floating platform containing varying amount of plant material against gravid *Ae. albopictus* females (1×=5 g leaves, 10 g wood; 2×=10 g leaves, 20 wood; 3×=15 g leaves, 30 g wood).
Figure 9:
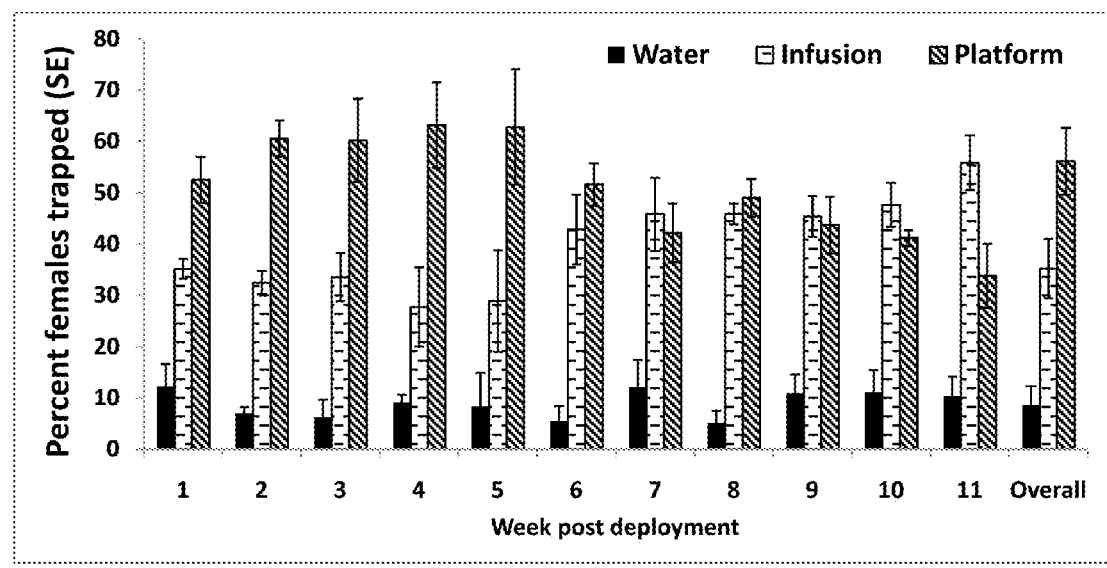
FIG. 9. Comparative weekly attractancy of floating platform with oak leaf and wood infusions (one week old), against gravid *Aedes albopictus*. In the test freshly prepared, oak wood+leaf infusion was used after one week of preparation. Floating platforms comprising 15 g leaf and 30 g wood of oak plant were tested at different time intervals (weeks 1-11) to assess impact of ageing on attractancy. Fresh dechlorinated tap water was used a control.

Initially, a floating platform was tested (80), where plant material was kept on a floating Styrofoam sheet and the cotton wick was placed at the center of the platform (FIG. 7). Platforms comprising different amounts of plant material were tested for oviposition attractancy. A platform comprising 15 g of leaves and 30 g wood performed best under the testing conditions employed (FIG. 8) as compared to results observed using plain water and the most active one-week-old infusion in 30 m$^3$ cage. The platform showed oviposition attractancy comparable to one-week-old infusion up to week 10 and was significantly higher up to 11 weeks when compared to water (FIG. 9).

Figure 11:
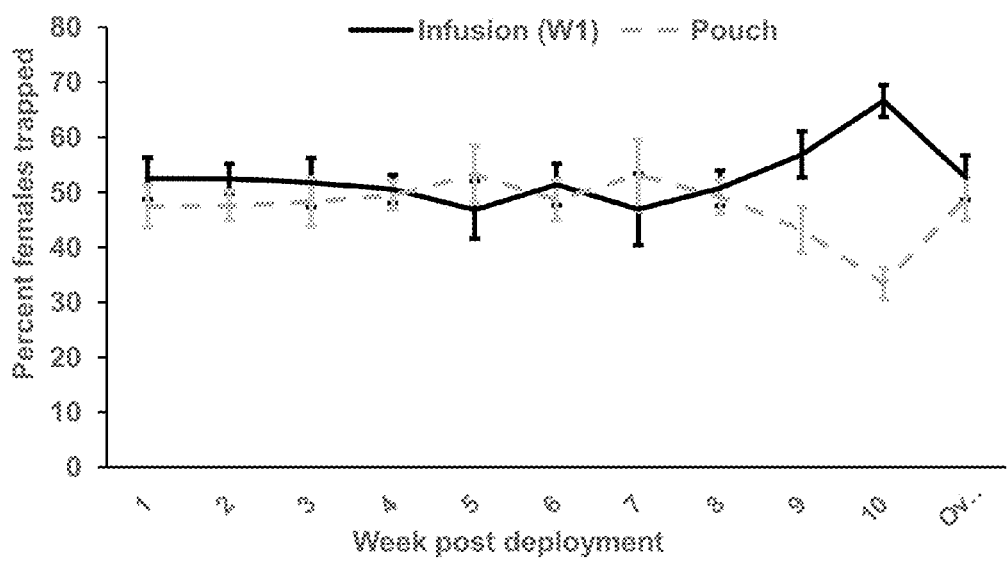
FIG. 11. Comparative weekly attractancy of oak wood+leaf infusion pouch with oak wood+leaf infusions (one week old) against gravid *Aedes albopictus*.

A pouch (95) (e.g., a porous fabric bag) comprising the infusion of the invention and a cotton wick hanging above, and extending into the water was also tested (FIG. 10). Similar to floating platform, the pouch described above demonstrates oviposition attractancy comparable to one-week old infusion up to week 8 (FIG. 11).

In efforts to enhance oviposition attractancy of the aged infusion, diluting the aged infusion, adding fresh plant material and taking a higher amount of plant material were tested. Only fresh leaf addition was effective to enhance oviposition attractancy of aged infusion. Plant material served as a substrate for the microbial activity that produces volatile cues. These cues are then used by females in selecting oviposition sites. The microbial community is already present in plant biomass and microbial degradation activity begins when plant materials are submerged in water. The amount of these chemical lures peaked after one week of preparation Afterward, oviposition attractancy began to diminish due to a reduction in substrate for the microbial community. This was confirmed, by adding the fresh leaf to the aged infusion, which resulted in the restoration of oviposition attractancy.

Figure 12:
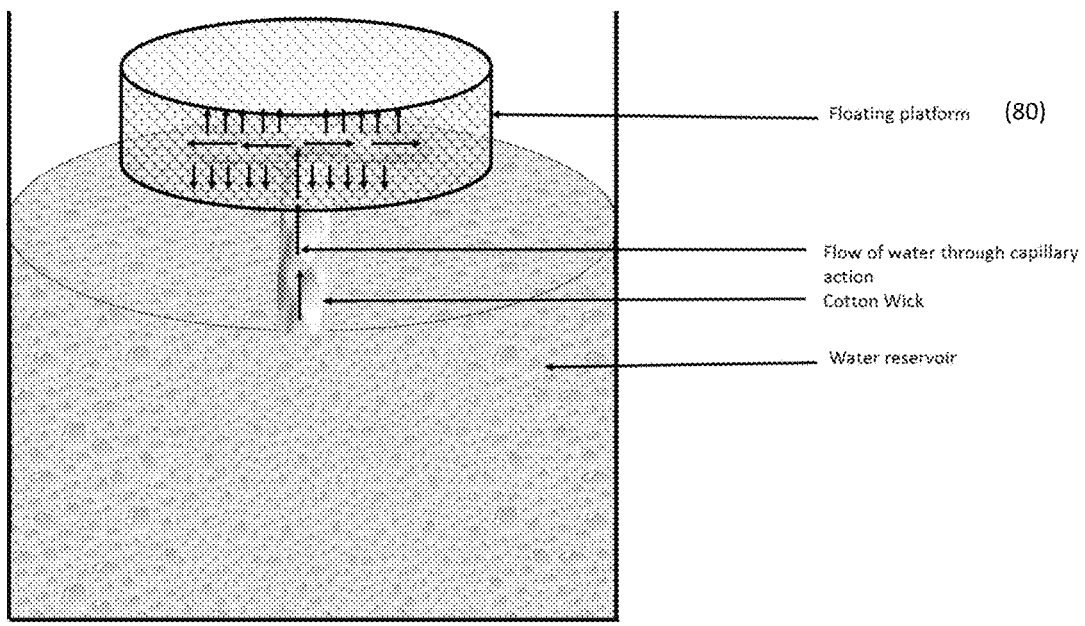
FIG. 12. Schematic representation of the flow of water (Black arrow) to plant material through the cotton wick.

To maintain the oviposition attractancy of oak infusion for a longer period, we have developed a process of slow and consistent release of the lure by slow degradation of the oak material. This process involved placement of plant material just above the water surface (50) with moisture being provided through a wicking mechanism using capillary action (FIG. 12). Thus, plant material gets enough water to maintain its microbial activity for a longer period, which resulted in oviposition attractancy long enough for entire mosquito season. Either a floating platform (80) or hanging pouch (95) can be used for this purpose.

The improved oviposition attractant apparatus includes an attractant substrate such as organic material for microbial activity; means to contain plant material; means to suspend or hold organic material just above the water surface (98); and a mechanism to provide water to plant material for fermentation.

While the infusion formulation described in Example I is preferred, any plant and plant parts having oviposition attractant properties can be used as an organic substrate. These include, without limitation, oak leaf, oak wood, bamboo leaf, hay, flower or any other parts of the plant. The amount of plant material required depends upon the size of the water reservoir and water surface area of the trap. In the case of an oak plant, the amount of plant material can range from 5 g to 50 g, whereas, the amount of wood can be ranged from 10 g to 100 gm.

Synthetic chemicals p-cresol, nonanoic acid, myristic acid, palmatic acid, methyl palmitate, stearic acid, dodecanoic acid, 3-methyl indole, 4-methyl indole, and phenol have shown oviposition attractancy for *Ae. albopictus* mosquitoes (FIGS. 15-18). In one embodiment, these synthetic chemicals individually or in combination can be added to plant material of the present invention, to enhance the oviposition attractancy. In other embodiments, the attractants of the invention lack these synthetic chemicals. Additionally, plant derivatives like syrups (maple syrup, oak syrup, corn syrup, soya syrup), essential oils, sugar, flour, microbes including bacteria, fungi and algae can also be included with the attractant substrate to enhance attractancy of present invention.

The plant material should be confined within the floating platform or pouch (FIG. 12). Ideally, plant material is secure and will not fall in the water reservoir. Placing plant material in tissue paper or filter paper or any other material which can transfer water using capillary action is suitable for this purpose. Use of paper serves two purposes. First, plant material is kept in a confined shape, and second, the paper functions as a wetting agent to moisturize plant material evenly. In certain embodiments, the paper can be encased within a fine plastic, nylon, metal, cotton, jute, pouch or other permeable non-biodegradable or biodegradable materials, as over the time the paper may get weak, causing release of plant materials into the water.

Increasing the longevity of the attractant over time is achieved by keeping plant material just above the water surface of the trap. Placing plant material on a platform or in a hanging pouch or any other structure, can be used to prevent direct contact of the attractant substrate with water. The platform can be a floating or a permanent structure in the water reservoir. The platform can be formed from Styrofoam sheets, plastic, rubber or any other water resistant material capable of floating on water within the reservoir.

In an alternative approach, the attractant substrate can be suspended just above the water surface by hanging or by affixing it (98) to the reservoir wall. The pouch should be placed just above the water surface of the container to prevent contact with water. The gap between the water surface and pouch is such that capillary action between the wick and the pouch is maintained and can range between 1 cm to 10 cm. The pouch can be affixed or suspended using wire or any other means, or can be tied up along the wall of the container using wire, zip-tie or string. Alternatively, the attractant can be incorporated in the water container as a fixed platform to hold attractant substrate just above the water surface.

Figure 13:
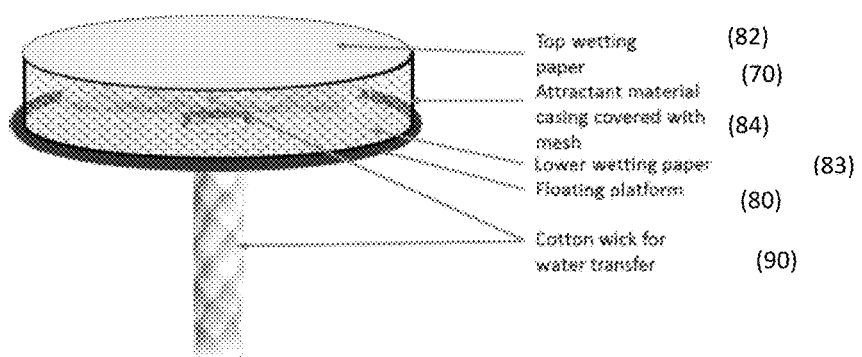
FIG. 13. Schematic representation of platform showing top wetting paper (82); attractant material (70); casing covered with mesh (84); lower wetting paper (83); floating platform (80) and cottonwick (90).
Figure 14:
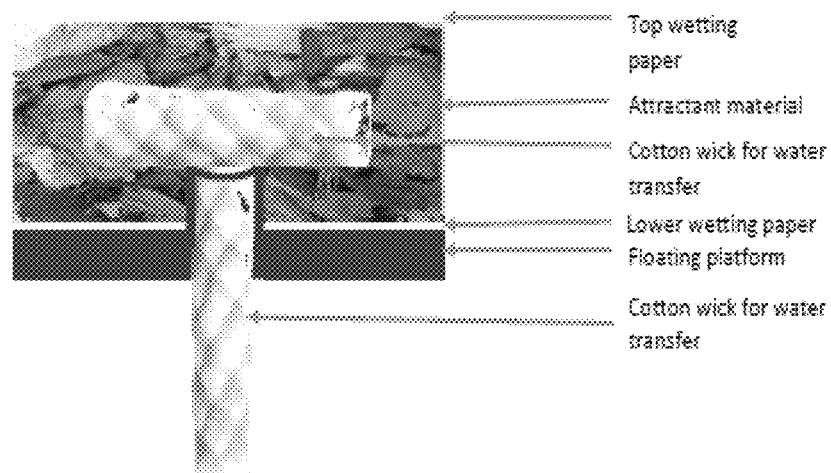
FIG. 14. Schematic representation of pouch.
Figure 15:
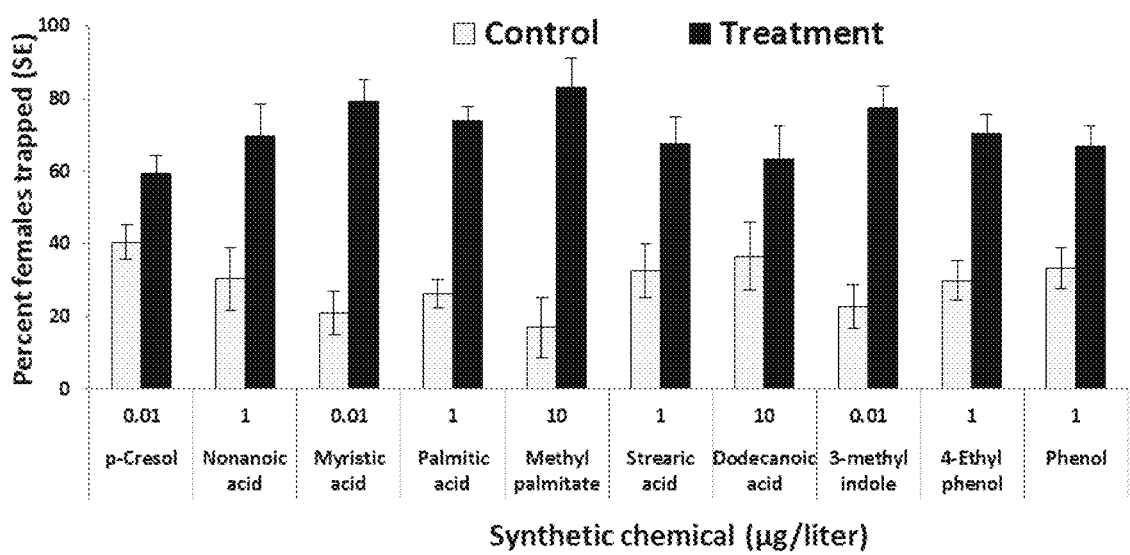
FIG. 15. Synthetic oviposition attractants (p-cresol, Nonanoic acid, myristic acid, palmatic acid, methyl palmitate, stearic acid, dodecanoic acid, 3-methyl indole, 4-methyl indole, phenol) against tap water for *Aedes albopictus* were tested to identify active concentration levels. These concentrations were estimated after oviposition attractancy test of gradual serial dilution for each chemical against water in 1 m$^3$ cage.
Figure 16:
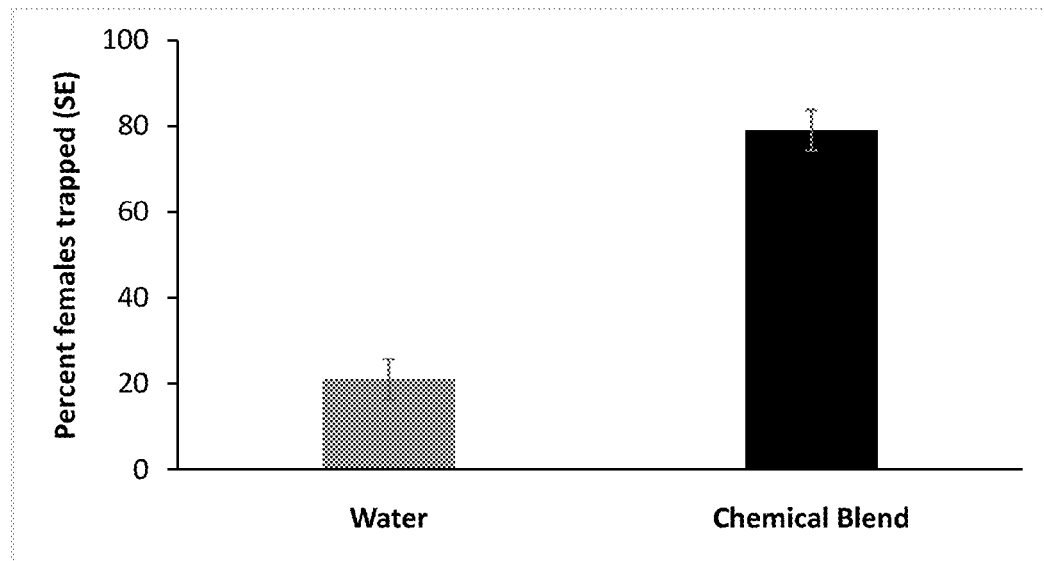
FIG. 16. Comparative testing of a blend of synthetic chemical oviposition attractants using amounts showing greatest levels of activity (0.01 µg/liter p-cresol, 1 µg/liter nonanoic acid, 0.01 µg/liter myristic acid, 1 µg/liter palmatic acid, 10 µg/liter methyl palmitate, 1 µg/liter stearic acid, 10 µg/liter dodecanoic acid, 0.01 µg/liter 3-methyl indole, 1 µg/liter 4-methyl indole, 1 µg/liter phenol) against tap water for *Aedes albopictus*.
Figure 17:
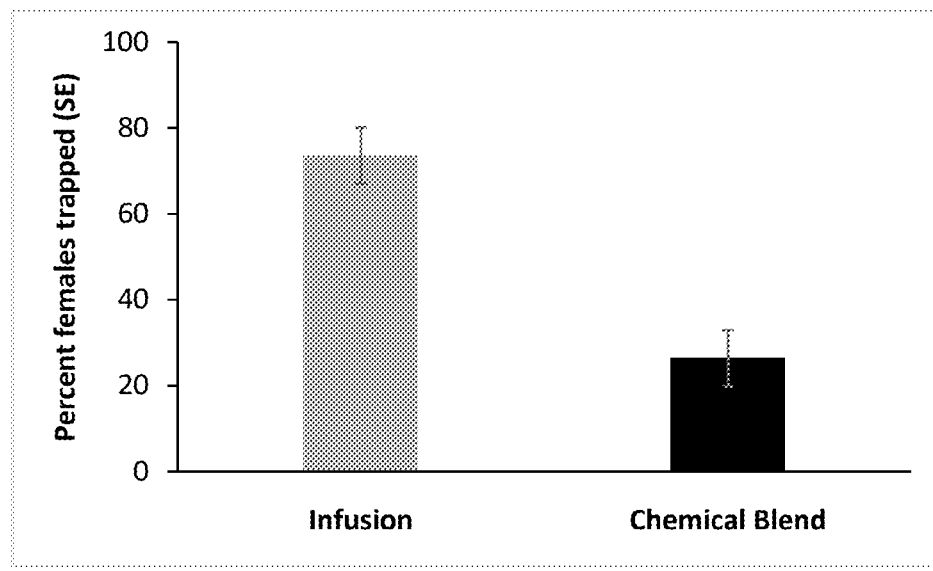
FIG. 17. Comparative evaluation of a blend of synthetic chemical oviposition attractants using using amounts showing greatest levels of activity (0.01 µg/liter p-cresol, 1 µg/liter nonanoic acid, 0.01 µg/liter myristic acid, 1 µg/liter palmatic acid, 10 µg/liter methyl palmitate, 1 µg/liter stearic acid, 10 µg/liter dodecanoic acid, 0.01 µg/liter 3-methyl indole, 1 µg/liter 4-methyl indole, 1 µg/liter phenol) against one week old oak wood+leaf infusion for *Aedes albopictus*.
Figure 18:
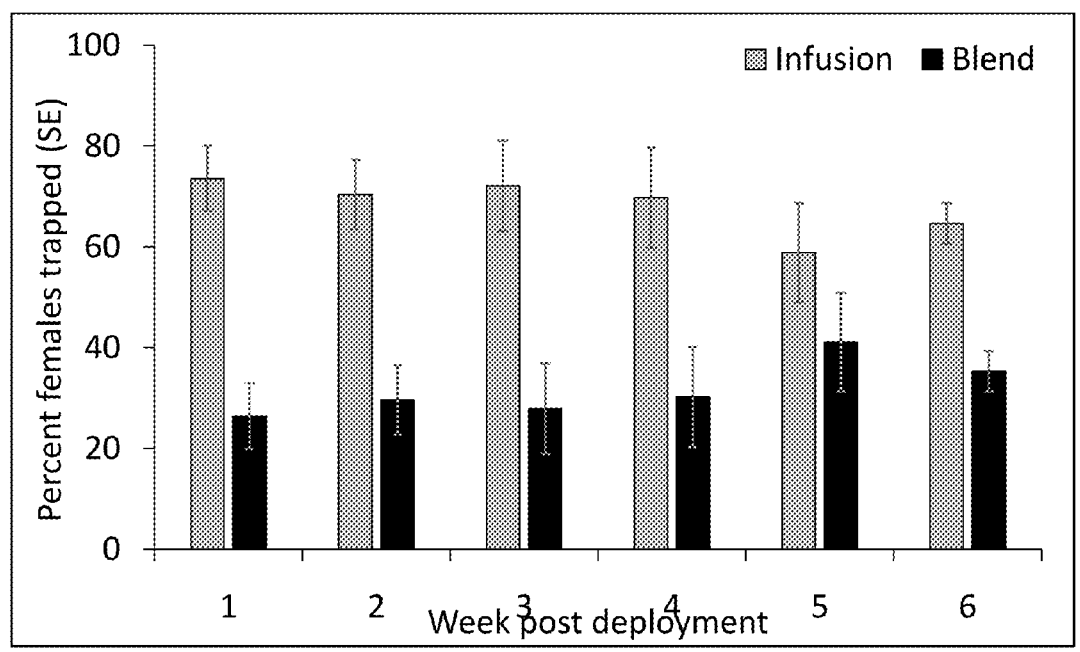
FIG. 18. Comparative overtime evaluation of a blend of synthetic chemical oviposition attractants containing most active concentrations (0.01 µg/liter p-cresol, 1 µg/liter nonanoic acid, 0.01 µg/liter myristic acid, 1 µg/liter palmatic acid, 10 µg/liter methyl palmitate, 1 µg/liter stearic acid, 10 µg/liter dodecanoic acid, 0.01 µg/liter 3-methyl indole, 1 µg/liter 4-methyl indole, 1 µg/liter phenol) against oak wood (10 g) leaf (5 g) infusion in water for *Aedes albopictus*.

The inventive apparatus also contains a wicking mechanism. Water is provided to moisturize plant material through capillary action (FIGS. 13 and 14). To provide enough water wicks can be formed from materials including but not limited to cotton, paper, fabric, etc. This wick will run through the plant material to ensure a sufficient and continuous supply of water for maintenance of microbial activity. The wick will be long enough to remain submerged in water over the mosquito breeding season. The number of wicks employed will vary depending upon the amount of plant material and size of the platform. Preferably, the apparatus will include between 1 to 10 wicks.

While the following discussion is in the context of oak infusion or oak plant and *Ae. albopictus* females, the formulation, process, and device described herein, are expected to be applicable to other plant materials and for other mosquito species. Methods of employing the inventive traps and attractants to control mosquito populations are also within the scope of the invention.

REFERENCES

1. Ritchie S A, et al. (2008) A biodegradable lethal ovitrap for control of container-breeding *Aedes*. Journal of the American Mosquito Control Association 24 (1):47-53.
2. Anderson E & Davis J (2014) Field evaluation of the response of *Aedes albopictus* (*Stegomyia albopicta*) to three oviposition attractants and different ovitrap placements using black and clear autocidal ovitraps in a rural area of Same, Timor-Leste. Med. Vet. Entomol. 28 (4): 372-383.
3. Chebabi Abramides G (2012) Effectiveness of an Integrated Vector Management control strategy for the tiger mosquito (*Aedes albopictus*): a case study in Sant Cugat del Vallès (Barcelona).
4. Juan L, Seccacini E, Zerba E, & Licastro S (2013) A new ovitrap made of slow release natural materials containing pyriproxyfen for *Aedes aegypti* (Diptera: Culicidae) control. Journal of Medical Entomology 50 (4):916-919.
5. Rapley L, et al. (2009) A lethal ovitrap-based mass trapping scheme for dengue control in Australia: II. Impact on populations of the mosquito *Aedes aegypti*. Med. Vet. Entomol. 23 (4):303-316.
6. Ritchie S A, et al. (2014) Field validation of the Gravid *Aedes* Trap (GAT) for collection of *Aedes aegypti* (Diptera: Culicidae). Journal of Medical Entomology 51 (1): 210-219.
7. Ritchie S A, et al. (2009) A lethal ovitrap-based mass trapping scheme for dengue control in Australia: I. Public acceptability and performance of lethal ovitraps. Med. Vet. Entomol. 23 (4):295-302.
8. Snetselaar J, et al. (2014) Development and evaluation of a novel contamination device that targets multiple lifestages of *Aedes aegypti*. Parasit Vectors 7:200.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A mosquito trap comprising: a biodegradable, foldable container having an open end, a unidirectional funnel inserted into said open end, said funnel including an opening to access an interior of the container, said interior of the container including paper comprising an adhesive effective for trapping mosquitoes, said container holding an infusion of at least one attractant for attracting said mosquitoes, said trap being pesticide free, wherein said at least one attractant-containing infusion consists of 10 g oak wood, 5 g oak leaf, and 1 L water, infused about one week.

2. The trap of claim 1, further comprising overflow holes to prevent overflow of said container.

3. The trap of claim 1, comprising hanging strings for hanging said trap at a site of interest and means for suspending an attractant containing infusion bag or a platform containing said at least one attractant above water in said container thereby preventing direct contact of said at least one attractant with water present in said trap.

4. The trap of claim 3, wherein said at least one attractant is encased in a porous mesh and present on a platform, said platform being suspended over water in said trap and comprising one or more wicks for moisturizing said at least one attractant.

5. The trap of claim 1, wherein said container is formed from waterproof wax paper.

6. The trap of claim 1, said at least one attractant being more attractive to gravid *Ae. albopictus* and *Ae. aegypti* females than infusions lacking oak wood.

7. The trap of claim 1, said at least one attractant attracting non-blood fed *Ae. albopictus* females.

8. The trap of claim 1, said at least one attractant attracting *Ae. albopictus* males.

9. A mosquito trap comprising: a biodegradable, foldable container having an open end, a unidirectional funnel inserted into said open end, said funnel including an opening to access an interior of the container, said interior of the container including paper comprising an adhesive effective for trapping mosquitoes, said container holding an infusion of at least one attractant for attracting said mosquitoes, said trap being pesticide free, wherein said at least one attractant-containing infusion consists of 10 g oak wood, 5 g oak leaf, 1 L water, and a sugar solution, infused about one week.

* * * * *